Figure 4:
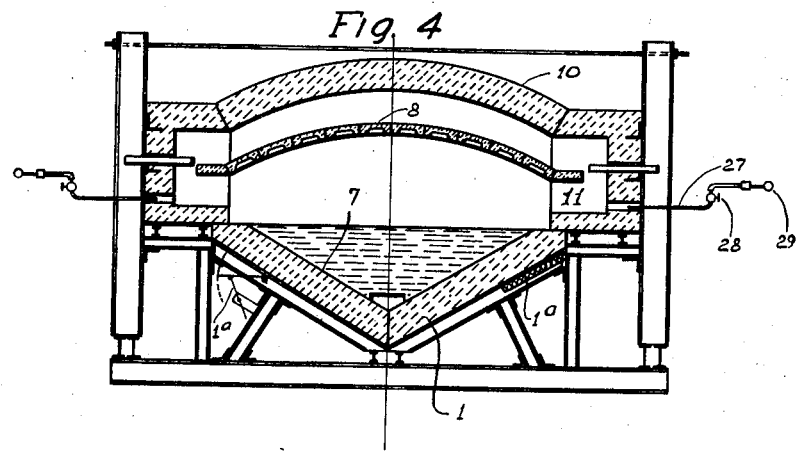

Feb. 12, 1935.  W. A. MORTON  1,991,331
GLASS MELTING TANK
Filed July 30, 1932   3 Sheets-Sheet 1
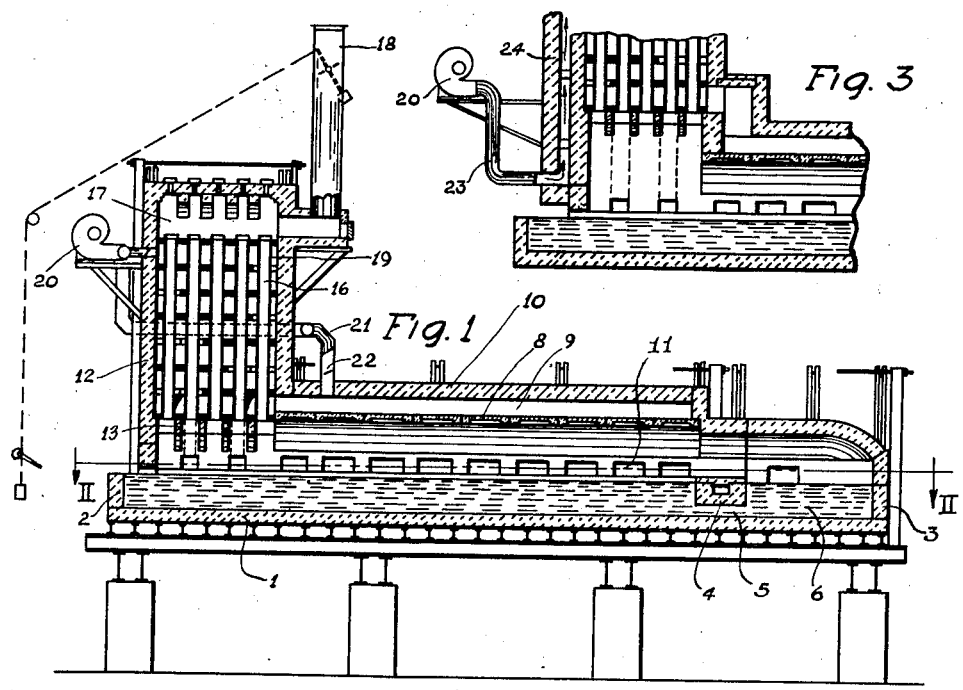
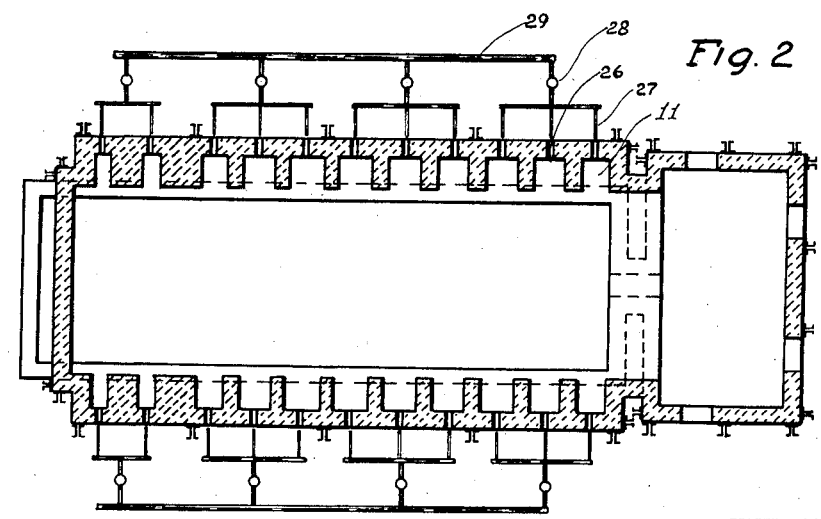
INVENTOR
William A. Morton
BY William B. Jaspert
ATTORNEY Feb. 12, 1935.  W. A. MORTON  1,991,331
GLASS MELTING TANK
Filed July 30, 1932  3 Sheets-Sheet 3
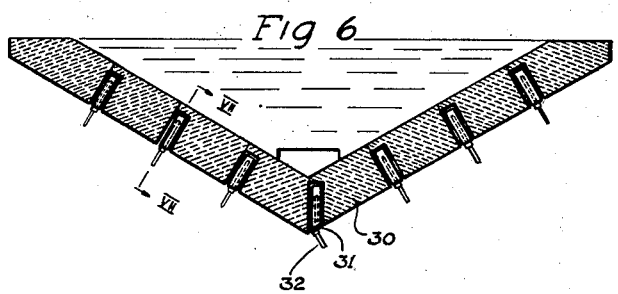
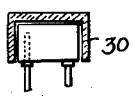
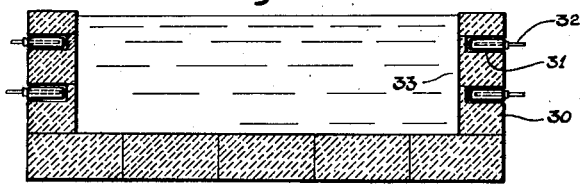
INVENTOR
William A. Morton
BY William B. Jasper
ATTORNEY Patented Feb. 12, 1935

1,991,331

UNITED STATES PATENT OFFICE 1,991,331

GLASS MELTING TANK

William A. Morton, Pittsburgh, Pa., assignor to Amco, Incorporated, Pittsburgh, Pa., a corporation of Pennsylvania Application July 30, 1932, Serial No. 626,915

10 Claims. (Cl. 49—54)

This invention relates to improvements in glass melting tanks and it is among the objects thereof to provide a glass melting apparatus in which the hearth is designed to facilitate the proper movement of the glass to the working chamber, conducive to the reduction of deleterious convection currents, and to render the application of the melting heat more effective on the surface of the glass.

A further object of the invention is the provision of means for obtaining a higher preheat of the air for supporting combustion in the furnace thereby intensifying the heat application to the glass in the tank by increasing the flame temperature, economizing on the consumption of fuel, and accelerating the melting rate of the glass.

Still a further object of the invention is the construction of a tank hearth and wall which shall be provided with means for resisting corrosion produced by the molten ingredients, particularly at high temperatures.

In the conventional type of glass melting furnace, the hearth and side wall for supporting the glass pool is constructed of refractory materials and is commonly of rectangular form with a basin of uniform depth into which raw materials are charged in granular and powderous form. In this type of furnace structure, the perpendicular side walls have a cooling effect on the glass which contacts them causing a temperature difference which creates convectional currents in the glass pool. Such convectional currents mix the surface materials with the heavier melted glass at the lower depths of the pool and causes unrefined glass to pass into the working chamber resulting in inferior products.

Also, the vertical side walls of the conventional glass melting furnace are subject to a vertical or static drilling action by the melting ingredients; this occurs where the chemical reactions of the glass are incompleted and the metal is in contact with the flux blocks after erosion has penetrated a sufficient distance horizontally to entrap the gases and allow them to assume a static position under the eroded shelves when this upward destructive boring action progresses to destroy the blocks. This action is observed in all tanks after the glass is drained therefrom.

In accordance with the present invention, these difficulties are overcome by providing a hearth structure of substantially V-shape for supporting a glass pool of uniform depth longitudinally of the furnace. In this way I eliminate the vertical side blocks which are subject to the destructive boring. I also form a less costly tank having less volume of molten glass without reducing the effective melting area which is exposed to the action of the flame.

Figure 5:
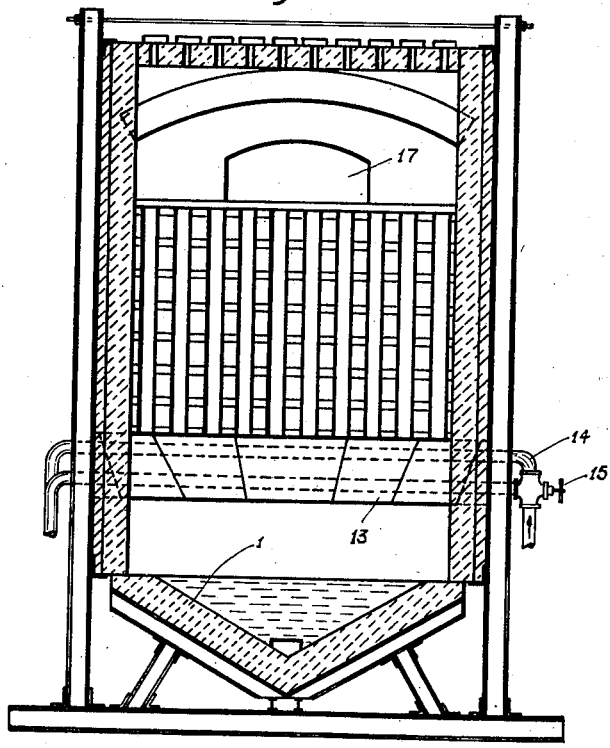

In the accompanying drawings constituting a part hereof in which like reference characters designate like parts:

Figure 1 is a cross-sectional view taken longitudinally of a recuperative type glass melting furnace embodying the principles of this invention;

Figure 2 a horizontal cross-section taken along the lines II—II of Figure 1;

Figure 3 a vertical sectional view of a portion of the recuperator structure and tank;

Figure 4 a transverse vertical cross-sectional view of the melting chamber;

Figure 5 a similar view of the melting chamber adjacent the recuperator structure;

Figure 6 a cross-sectional view of the hearth walls showing means for cooling the wall joints;

Figure 7 a cross-section taken on the line VII—VII, Figure 6; and,

Figure 8 is a cross-sectional view of a vertical wall type of tank illustrating means for cooling the wall joints.

With reference to the several figures of the drawings, the structure therein illustrated comprises a longitudinal hearth 1 for supporting a glass pool, having end walls 2 and 3 and a bridge wall 4, the latter being provided with a throated passage 5 to prevent the unplained surface glass passing from the melting chamber into the working chamber 6.

The hearth of the tank consists of a plurality of inclined walls 7, Figures 4 and 5, extending longitudinally of the furnace, the walls being inclined to provide a maximum melting surface area for a minimum volume of glass, and the inclination of the wall further prevents erosive action of the metal on the edge of the refractory material from which the walls are constructed particularly at the joints of the refractory blocks.

Shutters or louvers 1—a may be employed beneath the inclined walls 1 to control the temperature of the blocks and hence the glass at the point of minimum glass depth.

The primary purpose of inclining the hearth wall is to prevent the setting up of deleterious convection currents in the glass mass transversely in the pool whereby the unplained glass is conducted to the more viscous glass at the bottom of the tank and is allowed to pass through the throat 5 into the working chamber.

The melting chamber of the furnace is provided with a panelled roof 8 constructed of tile or panels formed of sillimanite or mullite, a highly refractory material, and the panels are relatively thin thereby permitting a greater loss of heat by radiation into the chamber 9 formed by an outer wall 10, this chamber being the preheat chamber through which the air utilized in support of combustion passes to the combustion compartments 11. The radiation losses from the wall 10 are less than in the ordinary furnace when the single outer wall is exposed to the radiant action of the melting heat. In my arrangement, I collect this radiant energy in the preheating air, raise the preheat temperature above that of the ordinary furnace, obtain increased preheat and therefore higher flame temperatures which increases the rate of glass melting above the ordinary furnace.

The space between the inner or panel wall 8 and the outer wall 10 is entirely closed with the exception of an opening adjacent a recuperator structure generally designated by the reference numeral 12 which extends upwardly from the melting chamber at the charging end of the furnace.

The open construction of the recuperator above the melting chamber is no part of the present invention, but one feature of the invention is the provision of a jack arch 13 for supporting the recuperator tile, which arch is provided with cooling means. In Figure 5, the arch is illustrated as provided with water pipes 14 provided with valves 15 to regulate the flow of the cooling medium through the arch as required, and it is apparent that instead of the water cooling system, air cooled conduits may be employed.

The recuperator structure comprises a series of tile constructed to provide vertical passages 16 through which the waste gases from the melting chamber pass upwardly into an accumulating chamber 17 from which they pass to a damper regulated stack 18.

A series of horizontal passages 19 in heat exchange relation with the vertical passages 16 conduct the air to be preheated through the successive horizontal passages into the chamber 9 directly above the melting chamber.

A blower 20 is provided for conducting the air under pressure through the recuperator tile structure into the chamber 9, and a by-pass conduit 21 is provided which conduit is regulated by a damper 22 whereby air may be blown directly through the by-pass into chamber 9 instead of to the recuperator tile structure when it is desired to raise the temperature of the tile in the recuperator for the purpose of melting off the flux material which may adhere thereto.

As shown in Figure 3 of the drawings the blower 20 may be provided with a conduit 23 which extends to the bottom of the recuperator to a hollow wall 24 whereby air drawn into the recuperator is preheated before it passes to the horizontal passages 19 as explained in connection with Figure 1 of the drawings.

With reference to Figures 2 and 4, a series of combustion compartments 11 are provided in the side wall of the melting chamber and ports 26 are provided in the side wall for fuel burners 27.

There are shown a series of two or three burners forming a bank which are separately controlled by valves 28 to regulate the fuel entering from the fuel supply line 29 to the combustion compartments 11 adjacent the surface of the glass pool as shown in Figure 1 of the drawings.

By employing the banks of burners in the manner shown a wide range of heat regulation may be obtained.

In Figures 6 to 8 inclusive of the drawings, the hearth walls are shown of sectional form with the flux of refractory blocks 30, Figures 6 and 7, retaining the glass each provided with a cooling chamber 31 having a conduit 32 disposed therein to cause a cooling fluid to be circulated at the joints of the blocks. By cooling the joints, which are the points where drilling or erosion mostly occurs, the erosive action is greatly reduced since the gases or chemicals acting on the blocks are less effective at lower temperatures. The coolers are advantageous in extending the life of the flux linings and are applicable to all forms of furnaces but are particularly advantageous where portions of the pool are relatively shallow.

In Figure 8, the cooling of the joints is applied to the conventional square tank furnace and is more essential because of the vertical disposition of the tank walls 33.

The operation of the above described apparatus is briefly as follows: The batch material, which consists of granular and powderous ingredients and fluxes is fed into the melting chamber in the region of the recuperator, and the waste gases from the combustion compartments 11 pass rearwardly and out through the vertical passages 19 of the recuperator, and in passing engage the dust produced by the batch entering the furnace and draw it into the recuperator instead of permitting it to pass forward in the furnace and settle on the refined glass at the top end of the furnace.

By utilizing the panel roof structure 8 as described in connection with Figure 1, the chamber 9 is intensely heated and the preheated air from the recuperator structure passing into chamber 9 is increased in temperature to such an extent that the heat applied to the melting chamber can be raised from 200° F. to 300° F. Also, by employing this heat exchange effect of the melting chamber roof, the front of the melting chamber can be greatly increased in temperature to effect proper plaining of the glass and also to increase the melting capacity of the chamber.

By employing the inclined wall 7 for the hearth structure, the turbulent effect of the chemical reaction as produced by heat is controlled so as to minimize the promotion of convection currents which would cause an intermingling of the plained bottom glass with the unmelted surface glass which has been the source of great difficulties in glass manufacture.

A cooling medium such as air is circulated in conduits 32 to cool the joints although obviously water may be employed as the cooling medium.

It is evident from the foregoing description of the invention that the employment of the inclined hearth wall, less area of contact is made with the glass without reducing the melting capacity of the furnace, and consequently there is less erosive action on the glass supporting surface.

I claim as my invention:

1. The combination in an industrial furnace, of a hearth, a combustion chamber over the hearth, a continuous heat exchanger over the hearth having its waste gas passages opening into the combustion chamber, and spaced arches provided with cooling means to support the heat exchanger.

2. The combination in an industrial furnace, of a hearth, a combustion chamber over the hearth, a continuous heat exchanger over the hearth having vertical waste gas passages opening into said chamber, and spaced arches provided with regulable cooling means to support the heat exchanger.

3. Glass melting furnace comprising a melting chamber and a refining chamber divided by a bridge wall, a roof structure above the melting chamber consisting of a continuous outer wall and a continuous inner wall, the latter comprising relatively thin panels in spaced relation with the outer wall forming a heating chamber for the preheated air, and the side wall of said furnace having combustion compartments in communication with the space formed by said inner wall.

4. In a glass melting furnace a longitudinal tank comprising a hearth having inclined walls, a plurality of combustion compartments disposed in spaced relation at the top of said hearth walls and a double crown bridging the side walls, the inner wall of which comprises a panel structure of relatively thin tile, said double crown being closed at one end at the refining area of said melting chamber and leading to the preheated air passages of a recuperator at its other end and forming a space in communication with said combustion compartments.

5. A glass melting tank comprising a rectangular wall structure having a bridge wall dividing it into a melting chamber and a refining chamber, a hearth having inclined walls extending longitudinally of said chambers, a double arch crown extending a minimum distance above the top of the inclined hearth wall having side openings forming combustion chambers, the inner arch of which comprising relatively thin panel tile to effect heat exchange relation between the interior of the melting chamber and the space between said crown.

6. In a glass melting furnace, a heating chamber, a hearth extending the length of said chamber, and firing ports at the sides of said chamber adjacent the hearth, said hearth being of V-shaped cross-section transversely to the longitudinal flow axis of the melted glass to support a glass pool of maximum surface area and maximum depth for a relatively small volume of glass mass, and the inclination of the hearth wall extending from the bottom in the center of the pool to a height below the burner ports in the side walls.

7. In a glass melting furnace, a heating chamber, a hearth extending the length of said chamber, a heat exchanger having its waste gas passages open to a portion of said chamber, a roof extending from said heat exchanger to the opposite end of said chamber, and a relatively thin partition wall between said roof and chamber forming a space for preheated air above the chamber, said air space being in heat exchange relation with said heating chamber through the said partition wall.

8. In a glass melting furnace, a heating chamber, a hearth extending the length of said chamber, a heat exchanger having its waste gas passages open to a portion of said chamber, a roof extending from said heat exchanger to the opposite end of said chamber, a relatively thin partition wall between said roof and chamber forming a space for preheated air above the chamber, and burner ports in longitudinally spaced relation on the side walls of said furnace below said partition wall and coextensive therewith, the air space above said partition wall communicating at one end with the preheated air passage of said heat exchanger and being in further communication with said firing ports.

9. In a glass melting furnace, a heating chamber, a hearth extending the length of said chamber, a plurality of burner ports provided longitudinally in the side walls of said chamber, said hearth being constituted of inclined walls diverging outwardly from the bottom to the side walls of the chamber above the level of the glass pool and being constructed of a plurality of refractory blocks assembled to form a jointed wall, the blocks being recessed at one end to form a pocket with the face of adjacent blocks for applying a cooling medium to the joints.

10. In a glass melting furnace, a heating chamber, a hearth extending the full length of said chamber, a bridge wall dividing said chamber into a melting and refining compartment, burner ports in the side wall of said melting compartment, and openings for removing the glass from said refining compartment, said hearth being constituted of inclined walls of substantially V-shape extending from the center at the bottom to a height below the burner ports in the side walls, and a constricted opening in the bridge wall at the apex of said hearth for directing the flow of glass from the melting to the refining chambers at the bottom thereof.

WILLIAM A. MORTON.